Figure 1:
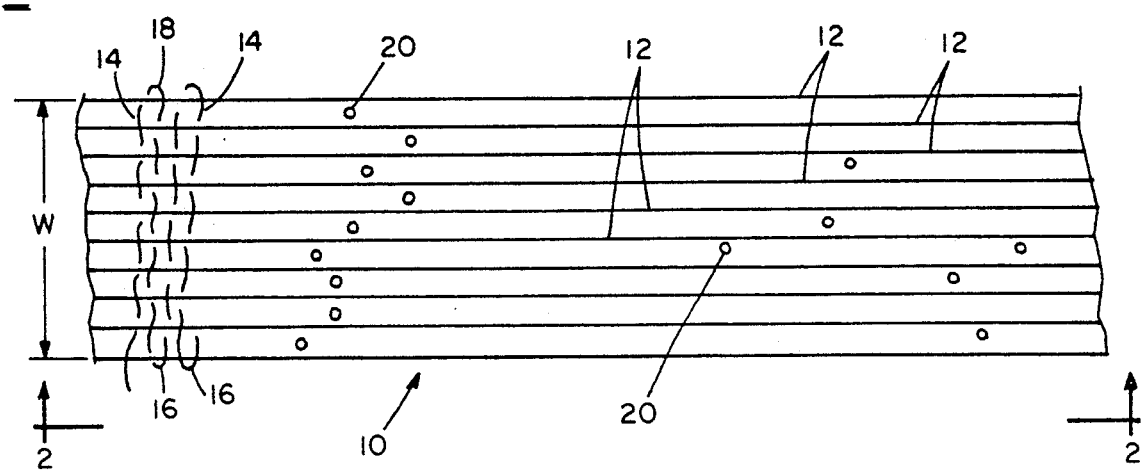

United States Patent [19]
Rich

[11] Patent Number: 5,030,493
[45] Date of Patent: Jul. 9, 1991

[54] HIGH STRENGTH RESIN-CLOTH STRUCTURAL SYSTEM

[75] Inventor: Benjamin P. Rich, Palm Beach Gardens, Fla.

[73] Assignee: Neptune Research, Inc., West Palm Beach, Fla.

[21] Appl. No.: 362,948

[22] Filed: Jun. 8, 1989

[51] Int. Cl.$^5$ .................. B32B 17/04; B32B 35/00; F16L 55/10; B29C 73/10
[52] U.S. Cl. .................................. 428/63; 29/402.09; 114/227; 138/97; 156/94; 264/36; 428/36.1; 428/36.91; 428/229; 428/258; 428/273; 428/337; 428/340; 428/302
[58] Field of Search ............... 29/402.09; 114/227; 138/97; 156/94; 264/36; 428/63, 229, 258, 273, 337, 440, 302

[56] References Cited

U.S. PATENT DOCUMENTS

| | | | |
|---|---|---|---|
| 3,388,016 | 6/1968 | Murray et al. | 156/94 |
| 3,531,345 | 9/1970 | Torosian | 156/94 |
| 3,847,722 | 11/1974 | Kistner | 428/76 |
| 4,519,856 | 5/1985 | Lazzara | 156/94 |
| 4,552,183 | 7/1985 | Check | 138/97 |
| 4,723,579 | 2/1988 | Hyodo et al. | 138/97 |
| 4,774,937 | 10/1988 | Scholy et al. | 156/94 |
| 4,824,500 | 4/1989 | White et al. | 156/94 |
| 4,853,165 | 8/1989 | Rozenweig et al. | 264/36 |
| 4,968,542 | 11/1990 | Gasper et al. | 428/308.4 |

*Primary Examiner*—James C. Cannon

[57] ABSTRACT

A high-strength patching material made of a cloth woven from continuous filament fiberglass warp and filling yarns and impregnated between the yarns with a resinous pliabile-plastic material which hardens spontaneously upon exposure to aqueous moisture is disclosed for use in leakproof patching of pipes and other containers of fluids under elevated pressures.

18 Claims, 1 Drawing Sheet

HIGH STRENGTH RESIN-CLOTH STRUCTURAL SYSTEM

BACKGROUND OF THE INVENTION

This invention relates in general to resin-cloth structural systems employing a resinous material that hardens spontaneously upon exposure to aqueous moisture for a wide variety of uses, as, for example, in repairing cracks, holes and dents in the hulls and bodies of boats, leaks in gas and liquid conduits such as hydraulic and lube oil lines, air lines, damage-control and fire-fighting lines and hoses, and water pipes, and leaks in gas and liquid tanks and other containers; and more particularly to a new and improved woven fiberglass cloth for use in such systems that are intended to contain and prevent leaks of fluids that are under elevated pressures. This invention is an improvement upon the invention of U.S. Pat. No. 4,519,856 which is assigned to the same assignee as the present invention, and the disclosure of that patent is incorporated herein by reference.

Resin-cloth structural and repair systems according to Pat. No. 4,519,856 have been used successfully in a wide variety of applications. With experience, and attempts to apply these systems more aggressively, it has been found, especially in applications where fluids under elevated pressures are to be contained, as in fire-fighting and damage-control systems aboard ships, and in hydraulic lines and lube oil lines, as some examples, that additional provision for preventing leaks of fluid through the repair is required. In presently-used systems it is desired that the cloth component of a repair system be soft and flexible, so that it can easily be shaped to conform with or wrap around a surface that is being patched or covered. Thus, while a cloth can be woven more densely to patch a roof or to seal a leak in a domestic water pipe, high pressures such as may be encountered in industrial fluid conduits, or aboard a Naval ship, require stronger and tighter repair systems that have up to now been available. However, simply adding strength to the yarns of which a cloth is woven is not a satisfactory solution to this problem, for the resulting cloth may fail to be adequately fluid-tight, or it may be too stiff and inflexible to be shaped or molded to a pipe or to a curved surface of a tank, for example, while the resin impregnating the cloth is becoming hard, or the resin may not be retained in the cloth well enough to prevent leaking of fluid that is under elevated pressure. The need is to construct a cloth which provides the necessary strength and leak prevention without being so hard and stiff that its usefulness is limited. This invention addresses that need.

GENERAL NATURE OF THE INVENTION

According to the invention, a cloth woven, preferably on a shuttle loom, from continuous filament fiberglass yarns to a yarn density of about 18 to 34 warp ends per inch and about 17 to 21 filling picks per inch is impregnated with a suitable resin (e.g: an aeromatic polyethylene urethane prepolymer which cures in the presence of water to form a hard semi-flexible polymer containing both polyurethane and polyurea groups, as is stated in U.S. Pat. No. 4,519,856), and stored in a stabilizing envelope until used. A preferred embodiment of this cloth is woven from warp yarn having a diameter of about 0.0175 inch and filling yarn having a diameter of about 0.0146 inch, and has a thickness from about 0.012 inch to about 0.019 inch. An electrical glass composition has been found to be preferable for the fiberglass yarns. A breaking strength in excess of 450 pounds per square inch is desirable, and easily provided.

EXEMPLARY EMBODIMENTS OF THE INVENTION

Figure 2:
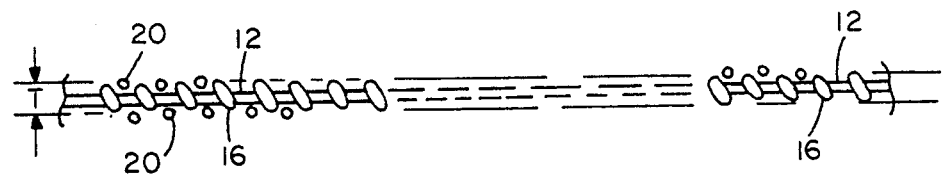
Figure 3:
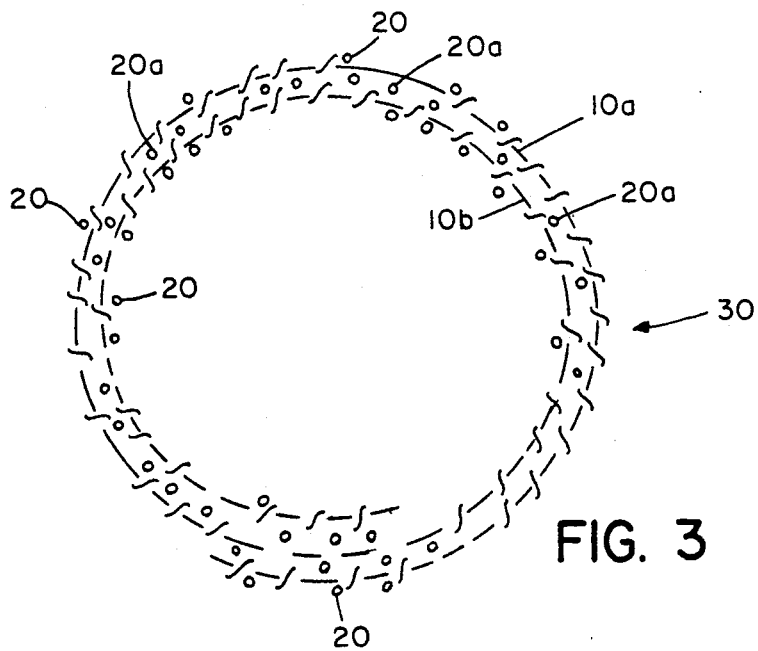

The invention is disclosed in greater detail in the following description of exemplary embodiments, with reference to the accompanying drawings, in which: FIG. 1 is a plan view, greatly expanded and schematic in form, of a woven fiberglass cloth according to the invention, impregnated with a resin; FIG. 2 is an edgewise view taken on line 2-2 of FIG. 1; and FIG. 3 is a schematic transverse-sectional illustration of a multilayered application of the resin-cloth system as it might be wrapped around a pipe.

The cloth 10 is woven of warp yarns 12 and filling yarns 14. As is mentioned above, this cloth is preferably woven on a shuttle loom, so that its thickness is uniform from edge to edge. The cloth may also be woven on a needle loom, which uses a catch cord and leaves a ridge at each edge. As woven on a shuttle loom, the filling yarn 14 is bent around the outermost warp yarns, at the edges of the cloth, to form bights 16 and 18. FIG. 1 illustrates a narrow fabric, or tape, of width "W". The resin 20 impregnates the fabric throughout its width. In the known manufacturing practice, a charge of the resin is applied to a length of the cloth 10, in a dry atmosphere, and the cloth is squeezed between two rollers (not shown) so as to impregnate the cloth thoroughly with the resin. A cloth without a ridge at each edge can be thoroughly impregnated with a smaller charge of the resin that can a cloth which has ridges at its edges and, as will be described, two or more layers of the cloth 10 without ridges can be more intimately bonded together. The resin 20 is represented in the drawings by a scattering of small circles.

Referring to FIG. 2, which is greatly enlarged relative to FIG. 1, the resin 20 is shown between adjacent bights 16 of of the filling yarn 14. The thickness "T" of the cloth 10 encompasses the filling yarn wrapped around the warp yarn. Three exemplary embodiments of the invention were prepared, in the form of woven fiberglass tapes having widths W of 2", 3", and 4", respectively. The construction data for each of these tapes are as follows:

| CONSTRUCTION DATA | |
|---|---|
| Thickness (T) | 0.016" ± 0.002" |
| Width (W) | 2 1/16" ± ¼" |
| | 3 1/16" ± ¼" |
| | 4 1/16" ± ¼" |
| Warp ends/inch of W | 28 ± 1 |
| Warp Yarn | 75 ½ Fiberglass 2.8 s |
| Filling Picks/Inch | 17 ± 2 |
| Filling Yarn | 50 2/0 Fiberglass 0.7 z |
| Breaking Strength | 450 pounds(minimum)/inch(untreated) |
| Weight | 10.9 oz/sq.yd ± 10% |
| Treatment | Silane |

It will be appreciated that these construction data are exemplary, and that the invention is not limited to them.

Prior to weaving these tapes the warp yarn diameter was about 0.0175 inch and the fill yarn (pick) diameter was about 0.0146 inch. In the weaving process these yarns were stretched and twisted, resulting in the cloth thickness stated in the construction data. The warp yarn was twisted 2.8 turns per inch in one direction (s), and the filling yarn was twisted 0.7 turns per inch in the other direction (z).

Figure three illustrates a multilayered patch 30 that can be made by wrapping, for example, the 4" tape described in the foregoing construction data around a leaking pipe (not shown). Two layers 10a and 10b are shown, but three or more layers can be used if desired. The resin 20 is found not only between the yarns of each layer, but also between the layers, as is indicated at 20a. Cloth woven on a shuttle loom enables the two adjacent tape layers 10a and 10b to be brought into intimate contact over their entire confronting areas, which in turn promotes bonding between the resin charges embedded in each layer. The result, after the resin has set into its hard semi-flexible state is a strong patch through which fluid under elevated pressure cannot leak.

The weight of the cloth 10 may range from about 7.75 ±10% to about 13±10% ounces per square yard.

I claim:

1. A high-strength construction material for substantially fliud-tight repairing, reinforcing, patching or sealing of articles containing fluid material under elevated pressure, said construction material comprising a cloth woven from continuous filament fiberglass warp and filling yarns and impregnated between said yarns with a resinous pliable-plastic material having the property that upon exposure to aqueous moisture it hardens spontaneously, said cloth having warp ends per inch ranging from 18 to 34,±1, and filling picks per inch ranging from 17 to 21,±2.

2. A construction material according to claim 1 in which said warp yarn has a diameter about 0.0175 inch, ±10% and said filling yarn has a diameter about 0.0146 inch, ±10%.

3. A construction material according to claim 1 in which each of said warp and filling yarns has approximately 2500 yards of bare glass per pound of fabricated yarn.

4. A construction material according to claim 2 in which each of said warp and filling yarns has approximately 2500 yards of bare glass per pound of fabricated yarn.

5. A construction material according to claim 1 in which said cloth has a thickness ranging from about 0.012 inch to about 0,019 inch.

6. A construction material according to claim 2 in which said cloth has a thickness ranging from about 0.012 inch to about 0.019 inch.

7. A construction material according to claim 3 in which said cloth has a thickness ranging from about 0.012 inch to about 0.019 inch.

8. A construction material according to claim 1 in which said cloth has weight ranging from about 7.75 to about 13 ounces per square yard, ±10%.

9. A construction material according to claim 8 in which said warp yarn has a diameter about 0.0175 inch, ±10% and said filling yarn has a diameter about 0.0146 inch, ±10%.

10. A construction material according to claim 9 in which each of said warp and filling yarns has approximately 2500 yards of bare glass per pound of fabricated yarn.

11. A construction material according to claim 10 in which said cloth has a thickness ranging from about 0.012 inch to about 0.019 inch.

12. A construction material according to claim 9 in which said cloth has a thickness ranging from about 0.012 inch to about 0.019 inch.

13. A construction material according to claim 8 in which said cloth has a thickness ranging from about 0.012 inch to about 0.019 inch.

14. A construction material according to claim 1 in which said cloth is that which had been woven on a shuttle loom.

15. A substantially fluid-tight structure comprising a plurality of layers of construction material according to claim 1 closely adjacent each other in which said resinous pliable-plastic material is united between said layers to form an integrated bonding mass extending substantially continuously throughout said layers.

16. A structure according to claim 15 in which the cloth of each of said layers is that which had been woven on a shuttle loom.

17. A construction material according to claim 2 in which during weaving the warp and filling yarns were each stretched and twisted to an extent that after weaving the cloth has a thickness ranging from about 0.012 inch to about 0.019 inch.

18. A construction material according to claim 17 in which the warp yarn is twisted approximately 2.8 turn per inch in a first direction, and the filling yarn is twisted approximately 0.7 turns per inch in the opposite direction.

* * * * *